US011681019B2

(12) United States Patent
O'Connor et al.

(10) Patent No.: US 11,681,019 B2
(45) Date of Patent: Jun. 20, 2023

(54) OPTICAL MODULE WITH STRAY LIGHT BAFFLE

(71) Applicant: Apple Inc., Cupertino, CA (US)

(72) Inventors: Eamon H. O'Connor, Emeryville, CA (US); Gregory A. Cohoon, Sunnyvale, CA (US); Calvin K. Wong, Cupertino, CA (US); Colleen F Mischke, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 668 days.

(21) Appl. No.: 16/574,129

(22) Filed: Sep. 18, 2019

(65) Prior Publication Data

US 2021/0080546 A1 Mar. 18, 2021

(51) Int. Cl.

| | |
|---|---|
| ***G01S 7/481*** | (2006.01) |
| ***G01S 17/10*** | (2020.01) |
| ***G02B 5/00*** | (2006.01) |
| ***G02B 7/02*** | (2021.01) |

(52) U.S. Cl.

CPC ............ *G01S 7/4813* (2013.01); *G01S 17/10* (2013.01); *G02B 5/003* (2013.01); *G02B 7/021* (2013.01)

(58) Field of Classification Search

CPC ........ G01S 7/4813; G01S 17/10; G01S 7/497; G01S 7/4814; G01S 7/4816; G01S 7/481; G01S 17/08; G02B 5/003; G02B 7/021; G02B 6/4204; G02B 5/00; G02B 7/02

See application file for complete search history.

(56) References Cited

U.S. PATENT DOCUMENTS

| | | | |
|---|---|---|---|
| 3,796,498 | A | 3/1974 | Post |
| 4,850,673 | A | 7/1989 | Velzel et al. |
| 5,406,543 | A | 4/1995 | Kobayashi et al. |
| 5,477,383 | A | 12/1995 | Jain |

(Continued)

FOREIGN PATENT DOCUMENTS

| | | | |
|---|---|---|---|
| CN | 1213244 | A | 4/1999 |
| CN | 1651971 | A | 8/2005 |

(Continued)

OTHER PUBLICATIONS

Examiner provided machine translation of Mei et al. (CN 108663670 A) (Year: 2018).*

(Continued)

*Primary Examiner* — Balram T Parbadia
(74) *Attorney, Agent, or Firm* — Kligler & Associates Patent Attorneys Ltd

(57) ABSTRACT

An optical device includes a substrate and an optical transmitter, which is mounted on the substrate and includes an optical emitter, which is configured to emit a beam of optical radiation, and a transmission lens assembly, which is configured to direct the beam along a transmit axis toward a target. An optical receiver is mounted on the substrate alongside the optical transmitter and includes an optical sensor and an objective lens assembly, which is configured to focus the optical radiation that is reflected from the target along a receive axis onto the optical sensor. An optical baffle is disposed asymmetrically relative to the transmit axis and has an asymmetrical shape configured to block preferentially stray radiation emitted from the optical transmitter toward the receive axis.

18 Claims, 4 Drawing Sheets

(56) References Cited

U.S. PATENT DOCUMENTS 5,606,181 A 2/1997 Sakuma et al.
5,648,951 A 7/1997 Kato
5,691,989 A 11/1997 Rakuljic et al.
5,742,262 A 4/1998 Tabata et al.
5,781,332 A 7/1998 Ogata
6,002,520 A 12/1999 Hoch et al.
6,031,611 A 2/2000 Rosakis et al.
6,229,598 B1 5/2001 Yoshida
6,288,775 B1 9/2001 Tanaka
6,560,019 B2 5/2003 Nakai
6,583,873 B1 6/2003 Goncharov et al.
6,611,000 B2 8/2003 Tamura et al.
6,707,027 B2 3/2004 Liess et al.
6,927,852 B2 8/2005 Reel
6,940,583 B2 9/2005 Butt et al.
7,112,774 B2 9/2006 Baer
7,227,618 B1 6/2007 Bi
7,304,735 B2 12/2007 Wang et al.
7,335,898 B2 2/2008 Donders et al.
7,700,904 B2 4/2010 Toyoda et al.
7,916,411 B1 * 3/2011 Lee ........................ G02B 7/006 359/829
7,952,781 B2 5/2011 Weiss et al.
8,384,997 B2 2/2013 Shpunt et al.
8,466,407 B2 6/2013 Martin et al.
8,807,766 B2 8/2014 Hung
9,157,790 B2 10/2015 Shpunt et al.
9,201,237 B2 12/2015 Chayat et al.
9,202,833 B2 12/2015 Mackey
9,335,220 B2 5/2016 Shpunt et al.
10,012,831 B2 7/2018 Gilboa et al.
10,950,743 B2 3/2021 Gopal Krishnan et al.
2004/0012958 A1 1/2004 Hashimoto et al.
2004/0082112 A1 4/2004 Stephens
2005/0030305 A1 2/2005 Brown et al.
2005/0178950 A1 8/2005 Yoshida
2006/0001055 A1 1/2006 Ueno et al.
2006/0072100 A1 4/2006 Yabe
2006/0215149 A1 9/2006 Labelle et al.
2006/0252167 A1 11/2006 Wang
2006/0252169 A1 11/2006 Ashida
2006/0269896 A1 11/2006 Liu et al.
2007/0019909 A1 1/2007 Yamauchi et al.
2008/0198355 A1 8/2008 Domenicali et al.
2008/0212835 A1 9/2008 Tavor
2008/0240502 A1 10/2008 Freedman et al.
2008/0278572 A1 11/2008 Gharib et al.
2009/0090937 A1 4/2009 Park
2009/0096783 A1 4/2009 Shpunt et al.
2009/0183125 A1 7/2009 Magal et al.
2009/0185274 A1 7/2009 Shpunt
2009/0237622 A1 9/2009 Nishioka et al.
2010/0007717 A1 1/2010 Spektor et al.
2010/0013860 A1 1/2010 Mandella et al.
2010/0127113 A1 * 5/2010 Taylor .................. F41G 7/2253 244/3.16
2010/0142014 A1 6/2010 Rosen et al.
2011/0019258 A1 1/2011 Levola
2011/0069389 A1 3/2011 Shpunt
2011/0075259 A1 3/2011 Shpunt
2011/0114857 A1 5/2011 Akerman et al.
2011/0141480 A1 6/2011 Meissner
2011/0187878 A1 8/2011 Mor et al.
2011/0188054 A1 8/2011 Petronius et al.
2011/0228251 A1 9/2011 Yee et al.
2011/0295331 A1 12/2011 Wells et al.
2012/0038986 A1 2/2012 Pesach
2012/0140094 A1 6/2012 Shpunt et al.
2012/0140109 A1 6/2012 Shpunt et al.
2013/0038881 A1 2/2013 Pesach et al.
2013/0038941 A1 2/2013 Pesach et al.
2013/0207970 A1 8/2013 Shpunt et al.
2014/0218715 A1 8/2014 Li
2014/0225824 A1 8/2014 Shpunt et al.
2014/0291491 A1 10/2014 Shpunt et al.
2015/0109586 A1 4/2015 Masuda
2016/0003944 A1 1/2016 Schmidtke et al.

FOREIGN PATENT DOCUMENTS

CN 1725042 A 1/2006
CN 1748120 A 3/2006
CN 201378231 Y 1/2010
CN 101874221 A 10/2010
CN 102200431 A 9/2011
CN 204580451 U 8/2015
DE 102009046911 A1 5/2011
JP 2011118178 A 6/2011
WO 2007/043036 A1 4/2007
WO 2007/105205 A2 9/2007
WO 2008/120217 A2 10/2008
WO 2010/004542 A1 1/2010
WO 2012020380 A1 2/2012
WO 2012066501 A1 5/2012

OTHER PUBLICATIONS

Fienup, J.R., "Phase Retrieval Algorithms: A Comparison", Applied Optics, vol. 21, No. 15, pp. 2758-2769, Aug. 1, 1982.

Awtar et al, "Two-axis Optical MEMS Scanner," Proceedings of the ASPE Annual Meeting ,Paper No. 1800, 4 pages, year 2005.

Sazbon et al., "Qualitative Real-Time Range Extraction for Preplanned Scene Partitioning Using Laser Beam Coding," Pattern Recognition Letters 26 , pp. 1772-1781, year 2005.

Gerchberg et al., "A Practical Algorithm for the Determination of the Phase from Image and Diffraction Plane Pictures," Journal Optik, vol. 35, No. 2, pp. 237-246, year 1972.

Moharam et al. "Rigorous coupled-wave analysis of planar-grating diffraction", Journal of the Optical Society of America, vol. 71, No. 6, pp. 818-818, Jul. 1981.

Eisen et al., "Total internal reflection diffraction grating in conical mounting" ,Optical Communications 261, pp. 13-18, year 2006.

O'Shea et al., "Diffractive Optics: Design, Fabrication and Test", SPIE Tutorial Texts in Optical Engineering, vol. TT62, pp. 66-72, SPIE Press, USA 2004.

Ezconn Czech A.S. "Site Presentation", 32 pages, Oct. 2009.

Luxtera Inc., "Luxtera Announces World's First 10GBit CMOS Photonics Platform", 2 pages, Carlsbad, USA, Mar. 28, 2005 (press release).

Bradley et al., "Synchronization and Rolling Shutter Compensation for Consumer Video Camera Arrays", IEEE International Workshop on Projector-Camera Systems—PROCAMS 2009, 8 pages, Miami Beach, Florida, 2009.

Marcia et al., "Fast Disambiguation of Superimposed Images for Increased Field of View", IEEE International Conference on Image Processing, 4 pages, San Diego, USA, Oct. 12-15, 2008.

Btendo, "Two Uni-axial Scanning Mirrors Vs One Bi-axial Scanning Mirror", 4 pages, Kfar Saba, Israel, Aug. 13, 2008.

Microvision Inc., "Micro-Electro-Mechanical System (MEMS) Scanning Mirror", 1 page, years 1996-2009.

Garcia et al . . . , "Projection of Speckle Patterns for 3D Sensing", Journal of Physics, Conference series 139, 7 pages, year 2008.

Garcia et al., "Three-dimensional mapping and range measurement by means of projected speckle patterns", Applied Optics, vol. 47, No. 16, pp. 3032-3040, Jun. 1, 2008.

EP Application 20182518.9 Search Report dated Dec. 10, 2020.

EP Application # 20182518.9 Office Action dated Sep. 20, 2022.

* cited by examiner

OPTICAL MODULE WITH STRAY LIGHT BAFFLE

FIELD OF THE INVENTION

The present invention relates generally to devices and methods for optical sensing, and particularly to optical transmitter/receiver modules.

BACKGROUND

Some types of optical sensing systems include an optical transmitter, which transmits a beam of optical radiation toward a target, and an optical receiver, which collects and senses the optical radiation that is reflected from the target. (The term "optical radiation," in the context of the present description and in the claims, refers to electromagnetic radiation in any of the visible, infrared, and ultraviolet spectral ranges, and may be used interchangeably with the term "light.") For example, in some depth sensing systems, the transmitter emits pulses of radiation toward a target, and the optical receiver senses the times of flight (ToF) of the pulses, and thus measures the distance to the target.

For many sensing applications, including ToF-based depth sensing, it can be advantageous to package the transmitter and receiver together on the same substrate in a compact package. An integrated optoelectronic module of this sort is described, for example, in U.S. Pat. No. 9,157,790.

ToF-based depth sensing devices are almost inevitably subject to stray reflections, which reflect or otherwise scatter from optical surfaces within the device back toward the receiver. In general, such stray reflections are regarded as noise, and designers of the devices do their best to eliminate them. On the other hand, U.S. Pat. No. 9,335,220, whose disclosure is incorporated herein by reference, describes a ToF-based scanner in which the stray reflections are used intentionally in calibrating the ToF measurements. In the disclosed scanner, a transmitter emits a beam comprising optical pulses toward a scene, and a receiver receives reflections of the optical pulses and outputs electrical pulses in response thereto. Processing circuitry is coupled to the receiver so as to receive, in response to each of at least some of the optical pulses emitted by the transmitter, a first electrical pulse output by the receiver at a first time due to stray reflection within the apparatus and a second electrical pulse output by the receiver at a second time due to the beam reflected from the scene. The processing circuitry generates a measure of the time of flight of the optical pulses to and from points in the scene by taking a difference between the respective first and second times of output of the first and second electrical pulses.

SUMMARY

Embodiments of the present invention that are described hereinbelow provide improved devices for optical transmission and reception.

There is therefore provided, in accordance with an embodiment of the invention, an optical device, including a substrate and an optical transmitter, which is mounted on the substrate and includes an optical emitter, which is configured to emit a beam of optical radiation, and a transmission lens assembly, which is configured to direct the beam along a transmit axis toward a target. An optical receiver is mounted on the substrate alongside the optical transmitter and includes an optical sensor and an objective lens assembly, which is configured to focus the optical radiation that is reflected from the target along a receive axis onto the optical sensor. An optical baffle is disposed asymmetrically relative to the transmit axis and has an asymmetrical shape configured to block preferentially stray radiation emitted from the optical transmitter toward the receive axis.

In some embodiments, the substrate includes an electrical circuit substrate on which the optical emitter and the optical sensor are mounted, and the device includes ancillary electronic components, which are mounted on the electrical circuit substrate and connected to the optical emitter and the optical sensor by electrical circuit traces. In a disclosed embodiment, the device includes a case, which contains the transmission lens assembly and the objective lens assembly and is fixed to the substrate so that the transmission lens assembly and the objective lens assembly are positioned respectively over the optical emitter and the optical sensor.

In some embodiments, the transmission lens assembly includes one or more lenses mounted in a lens barrel, and the optical baffle protrudes asymmetrically from the lens barrel toward the substrate in a location between the transmit axis and the receive axis. In one embodiment, the optical baffle is an integral part of the lens barrel. Alternatively, the optical baffle includes a collar mounted on the lens barrel. Additionally or alternatively, the optical baffle includes an aperture configured to pass a predefined fraction of the emitted beam through the baffle toward the optical sensor.

In a disclosed embodiment, the device includes a light guide extending through the baffle and configured to pass a predefined fraction of the emitted optical radiation through the baffle toward the optical sensor.

In another embodiment, the optical baffle includes a compressible radiation-absorbing material, which is compressed upon assembly of the device, thereby preventing the stray radiation from reaching the optical sensor.

There is also provided, in accordance with an embodiment of the invention, an optical device, including a substrate. An optical receiver, which is mounted on the substrate, includes an optical sensor and a compressible radiation-absorbing material surrounding the optical sensor. An objective lens assembly includes one or more lenses configured to focus optical radiation along a receive axis onto the optical sensor, and a lens barrel, which contains the one or more lenses, and which is mounted in the device so as to compress the radiation-absorbing material, thereby preventing stray radiation from reaching the optical sensor.

In a disclosed embodiment, the device includes an optical transmitter, which is mounted on the substrate alongside the optical receiver, and which is configured to emit a beam of the optical radiation along a transmit axis toward a target, wherein the one or more lenses are configured to focus the optical radiation that is reflected from the target onto the optical sensor.

Additionally or alternatively, the substrate includes an electrical circuit substrate on which the optical emitter and the optical sensor are mounted, and the device includes ancillary electronic components, which are mounted on the electrical circuit substrate and connected to the optical emitter and the optical sensor by electrical circuit traces.

There is additionally provided, in accordance with an embodiment of the invention, a method for optical sensing, which includes mounting an optical transmitter on a substrate. The optical transmitter includes an optical emitter, which is configured to emit a beam of optical radiation, and a transmission lens assembly, which is configured to direct the beam along a transmit axis toward a target. An optical receiver is mounted on the substrate alongside the optical transmitter. The optical receiver includes an optical sensor and an objective lens assembly, which is configured to focus the optical radiation that is reflected from the target along a receive axis onto the optical sensor. An optical baffle is positioned asymmetrically relative to the transmit axis. The optical baffle has an asymmetrical shape configured to block preferentially stray radiation emitted from the optical transmitter toward the receive axis.

The present invention will be more fully understood from the following detailed description of the embodiments thereof, taken together with the drawings in which:

DETAILED DESCRIPTION OF EMBODIMENTS

Figure 1:
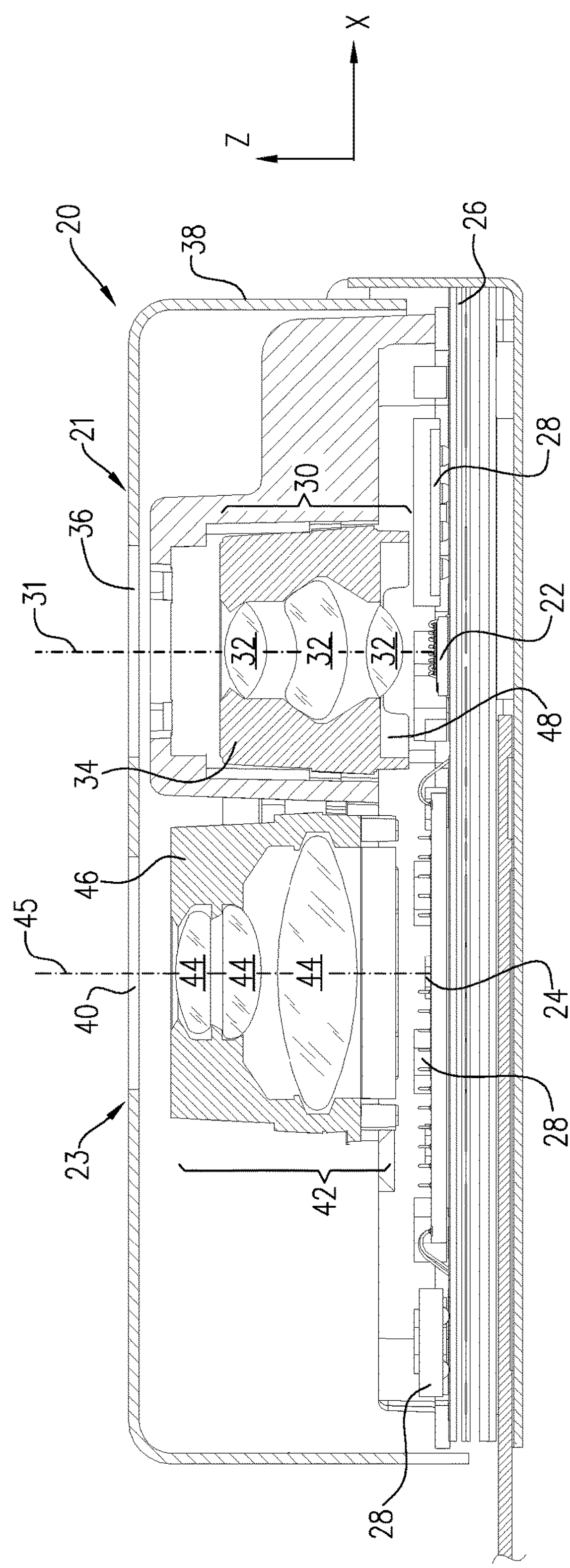
FIG. 1 is a schematic sectional view of an optical module, in accordance with an embodiment of the invention.

In designing an optical module that includes a transmitter and a receiver, it is important to minimize the amount of stray radiation that reaches the receiver, and particularly stray radiation emitted from the transmitter toward the receiver. This radiation is "stray" in the sense that it does not exit the module along the intended transmit path toward the target and then return from there to the receiver through the objective lens assembly, but rather reflects internally with the module, typically from one or more of the optical or mechanical surfaces in the module. Even a small amount of this sort of stray radiation can severely degrade the performance of the optical module, by adding substantial noise to the signals output by the receiver.

Baffles are mechanical elements that are introduced into optical designs in order to block stray radiation and prevent it from reaching the target of the objective lens assembly (such as the sensor in a ToF sensing device). Baffles are usually designed to be a part of or attached to the barrel (i.e. the housing) of the objective lens assembly, with circular symmetry around the optical axis of the lens assembly.

Careful optical design and baffling can eliminate most stray reflections; but when the transmitter and receiver are mounted together on the same substrate in a compact package, it is generally not possible to close off all possible paths that stray radiation could follow. For example, when ancillary electronic components are mounted on the substrate together with the optical emitter and the optical sensor, it may not be possible to surround the emitter or the sensor completely with a baffle that extends all the way down to the substrate. Furthermore, in ToF sensing modules, it may actually be desirable to allow a small amount of stray radiation to reach the optical sensor from the emitter in order to serve as a zero-reference for the ToF measurements, for example as described in the above-mentioned U.S. Pat. No. 9,335,220.

Some embodiments of the present invention address these problems using an asymmetrical stray light baffle. In these embodiments, an optical device comprises an optical transmitter and an optical receiver, both mounted on a substrate, one alongside the other. The optical transmitter comprises an optical emitter, which emits a beam of optical radiation (a pulsed beam in the case of ToF measurement), and a transmission lens assembly, which directs the beam along a transmit axis toward a target. The optical receiver comprises an optical sensor and an objective lens assembly, which focuses the optical radiation that is reflected from the target along a receive axis onto the optical sensor. An optical baffle is disposed asymmetrically relative to the transmit axis and has an asymmetrical shape that is designed to preferentially block stray radiation emitted from the optical transmitter from propagating toward the receive axis.

In some of the present embodiments, the optical baffle protrudes asymmetrically from the lens barrel toward the substrate in a location between the transmit axis and the receive axis. This optical baffle may be an integral part of the lens barrel, or it may be a separate piece, for example in the form of a collar mounted on the lens barrel. In either case, the asymmetrical design makes it possible to mount ancillary electronic components on the substrate in close proximity to the emitter, typically on the side of the emitter opposite to the protruding baffle (i.e., on the opposite side from the receiver). The baffle can also be designed to permit a small, controlled amount of stray light to reach the optical sensor in order to serve as the zero reference. In one embodiment, the optical baffle comprises an aperture configured to pass a certain fraction of the emitted beam through the baffle toward the optical sensor.

Figure 2:
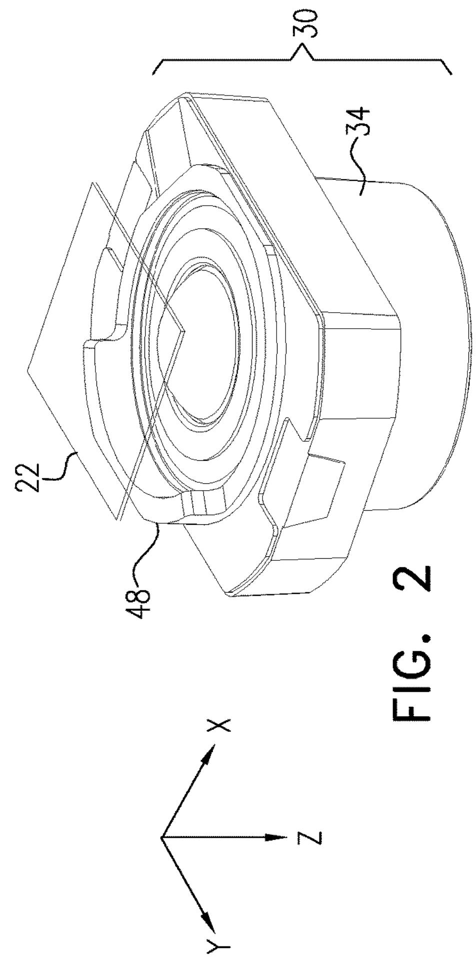
FIG. 2 is a schematic pictorial view of a transmission lens assembly, in accordance with an embodiment of the invention.

Reference is now made to FIGS. 1 and 2, which schematically illustrate an optical device in the form of an optical module 20, in accordance with an embodiment of the invention. FIG. 1 is a sectional view of the optical module, while FIG. 2 shows a pictorial view of a transmission lens assembly 30 in module 20.

Module 20 comprises an optical transmitter 21 and an optical receiver 23, which are mounted one alongside the other on a substrate 26. Substrate 26 typically comprises an electrical circuit substrate, such as a printed circuit board. Transmitter 21 comprises an optical emitter 22, for example a suitable light-emitting diode (LED) or laser, such as a vertical-cavity surface-emitting laser (VCSEL), or an array of such LEDs or lasers, which may emit pulsed, continuous, or modulated radiation. Receiver 23 comprises an optical sensor 24, for example an avalanche photodiode (APD) or a single-photon avalanche diode (SPAD) or an array of such photon detectors, or alternatively a detector or detector array that is capable of continuous or gated sensing. Emitter 22 and sensor 24 are mounted on substrate 26 together with ancillary electronic components 28, such as drivers, amplifiers and control circuits, which are typically connected to the emitter and the sensor by electrical circuit traces.

Emitter 22 emits a beam of optical radiation, and a transmission lens assembly 30 collects and directs the beam along a transmit axis 31 toward a target (not shown in the figures). Transmission lens assembly 30 comprises one or more lenses 32 (multiple lenses in the pictured example), which are mounted in a lens barrel 34. Lenses 32 direct the beam through an exit window 36, which opens through a case 38.

Receiver 23 comprises an objective lens assembly 42, comprising one or more lenses 44, which are mounted in a barrel 46. Lenses 44 focus the optical radiation that is reflected from the target along a receive axis 45 through an entrance window 40 in case 38 onto optical sensor 24. Case 38 is fixed to substrate 26 so that transmission lens assembly 30 and objective lens assembly 42 are positioned respectively over optical emitter 22 and optical sensor 24.

An optical baffle 48 protrudes asymmetrically from lens barrel 34 toward substrate 26 in a location between transmit axis 31 and receive axis 45. The asymmetrical shape and disposition of baffle 48 relative to transmit axis 31 will preferentially block stray radiation emitted from emitter 22 toward receive axis 45 (including both rays emitted directly from the emitter itself and rays reflected from other elements of transmitter 21, such as from the surfaces of lenses 32). In this embodiment, optical baffle 48 is an integral part of lens barrel 34; but alternatively, the baffle may be produced separately and fastened to the lens barrel or otherwise mounted within case 38. All such alternative implementations of an asymmetrical baffle of this sort are considered to be within the scope of the present invention.

The asymmetrical design of optical baffle 48 has a number of advantages in the context of module 20. This design can relieve other packaging constraints, for example by making it possible to mount relatively large ancillary components, such as component 28 to the right of emitter in FIG. 1, in close proximity to the emitter. Furthermore, the baffle can be designed to permit a small amount of stray light to reach sensor 24, in order to enable ToF calibration without causing excessive noise in receiver 23.

Figure 3A:
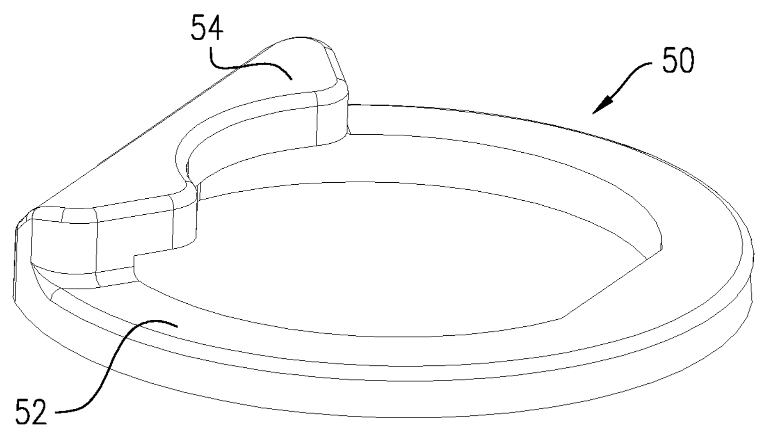
FIG. 3A is a schematic pictorial view of a stray light baffle, in accordance with an embodiment of the invention.
Figure 3B:
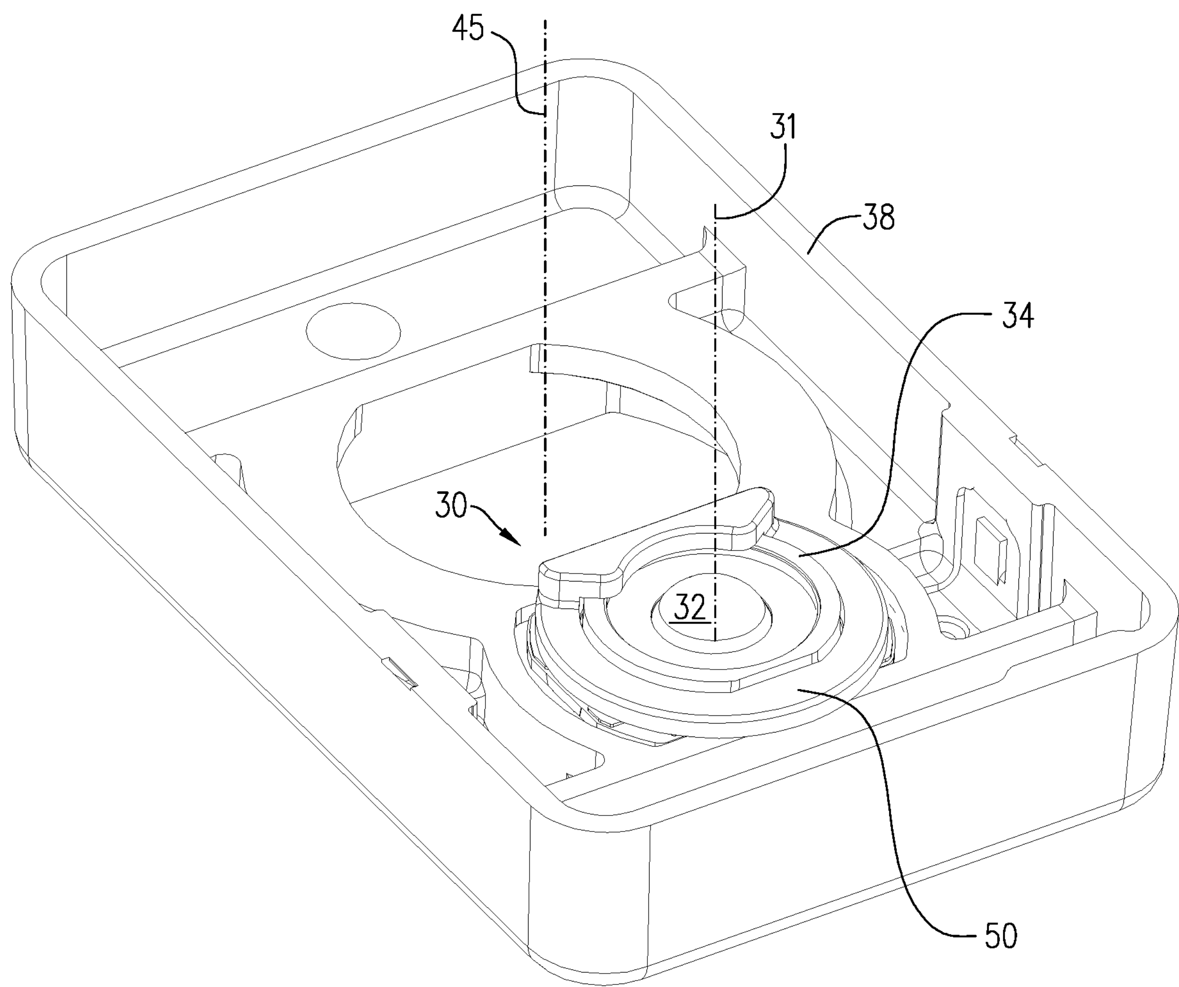
FIG. 3B is a schematic pictorial view of a transmission lens assembly incorporating the stray light baffle of FIG. 3A in an optical module, in accordance with an embodiment of the invention.

Reference is now made to FIGS. 3A and 3B, which schematically illustrate the design and operation of a stray light baffle 50, in accordance with another embodiment of the invention. FIG. 3A is a pictorial view of baffle 50, while FIG. 3B is a pictorial view of transmission lens assembly 30 incorporating baffle 50 inside case 38 of an optical module.

Baffle 50 in this embodiment comprises a collar 52, which mounts on lens barrel 34. An asymmetrical protrusion 54 extends above collar 52 in the area between transmit axis 31 and receive axis 45, and thus preferentially blocks stray radiation emitted from the optical transmitter toward the receive axis. The use of this sort of separate collar component allows for greater flexibility of design and possibly easier assembly of the module. For example, the shape of baffle 50 can readily be molded as a separate component, but might be difficult to mold as an integral component of the lens barrel or might interfere with subsequent assembly of lenses 32 into the barrel. The use of a separate baffle of this sort also makes it possible to update and improve the baffle design without having to modify the entire lens barrel.

Figure 4:
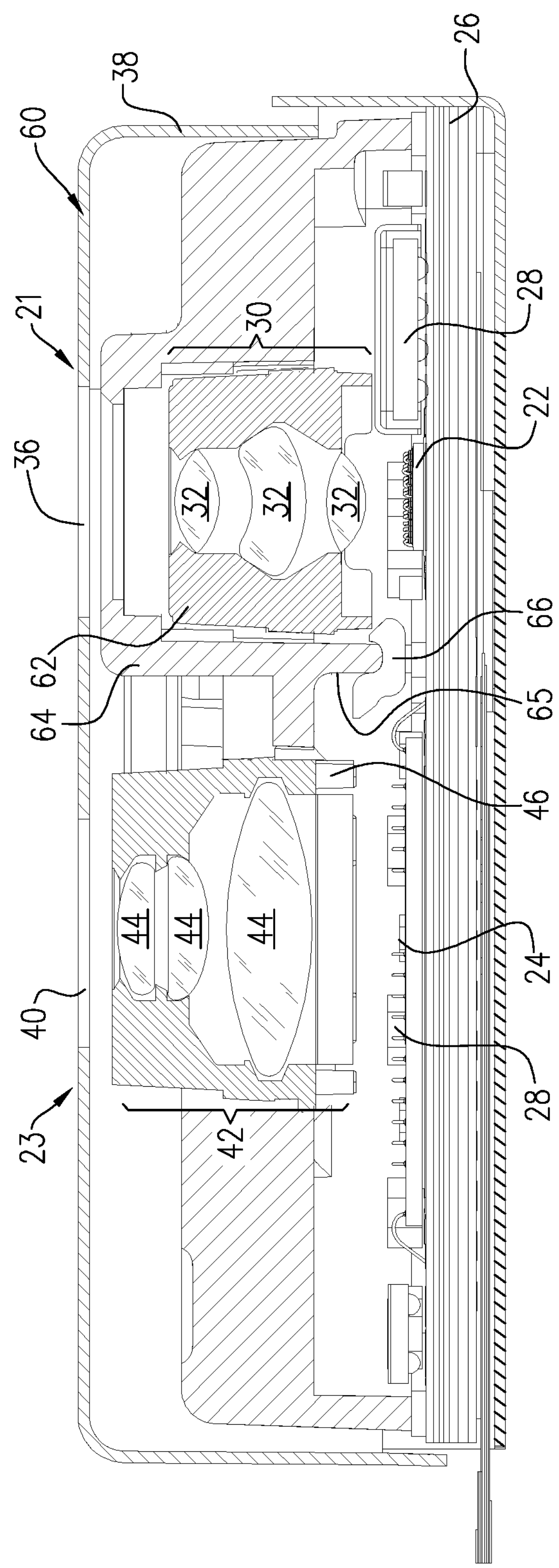
FIG. 4 is a schematic sectional view of an optical module, in accordance with another embodiment of the invention.

FIG. 4 is a schematic sectional view of an optical module 60, in accordance with another embodiment of the invention. In this embodiment, transmission lens assembly 30 is contained in a dual barrel, including an inner barrel 62 in which lenses 32 are mounted and an outer barrel 64, which is fixed to substrate 26. Outer barrel 64 includes a baffle 65, which protrudes asymmetrically toward substrate 26, between transmitter 21 and receiver 23. In this case, however, baffle 65 has an aperture that is configured to pass a small fraction of the radiation output by emitter 22 through the baffle toward optical sensor 24.

In the pictured embodiment, a light guide 66 extends through baffle 65 order to control and direct the stray radiation from emitter 22 toward sensor 24. Light guide 66 is designed to pass a predefined fraction of the emitted optical radiation through the baffle and direct it toward the optical sensor. Alternatively, baffle 65 may simply contain an aperture for such stray light, without the light guide.

Figure 5:
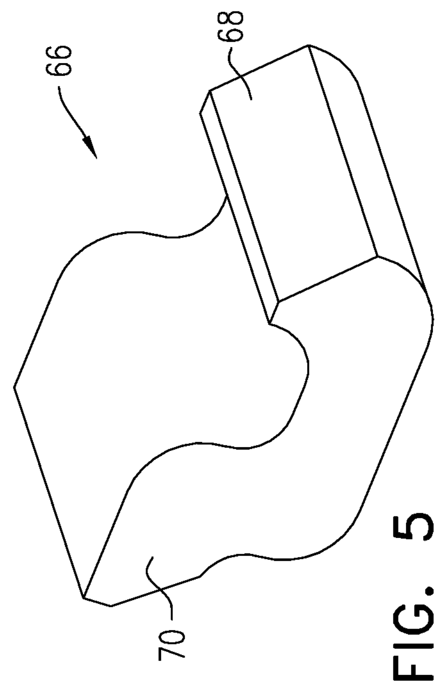
FIG. 5 is a schematic pictorial view of a light guide used in the optical module of FIG. 4, in accordance with an embodiment of the invention.

FIG. 5 is a schematic pictorial view of light guide 66, in accordance with an embodiment of the invention. Light guide 66 comprises a suitable transparent material, such as a glass or transparent plastic. An entrance face 68 of the light guide is angled in this example to receive stray radiation that is reflected from lower lens 32 in transmission lens assembly 30. An exit face 70 of the light guide outputs the stray light toward sensor 24. Entrance face 68 and/or exit face 70 may be masked and/or coated in order to control the amount of radiation that is passes through the light guide. Additionally or alternatively, light guide 66 itself may comprise a volume of material that absorbs radiation for this purpose.

Further additionally or alternatively, light guide 66 may be shaped or patterned to control the spatial distribution of the stray radiation that is emitted through exit face 70. For example, light guide 66 may be configured to direct the radiation specifically toward certain reference pixels in sensor, while avoiding irradiation of the pixels that receive radiation from the target. For such purposes, exit face 70 may be cylindrical or wedged, or may be patterned with a nano-structured diffractive optical element to control the direction of the light. Alternatively, the stray light transmitted through light guide 66 may be diffused by roughening exit face 70 or adding a lenslet array on the exit face.

Figure 6:
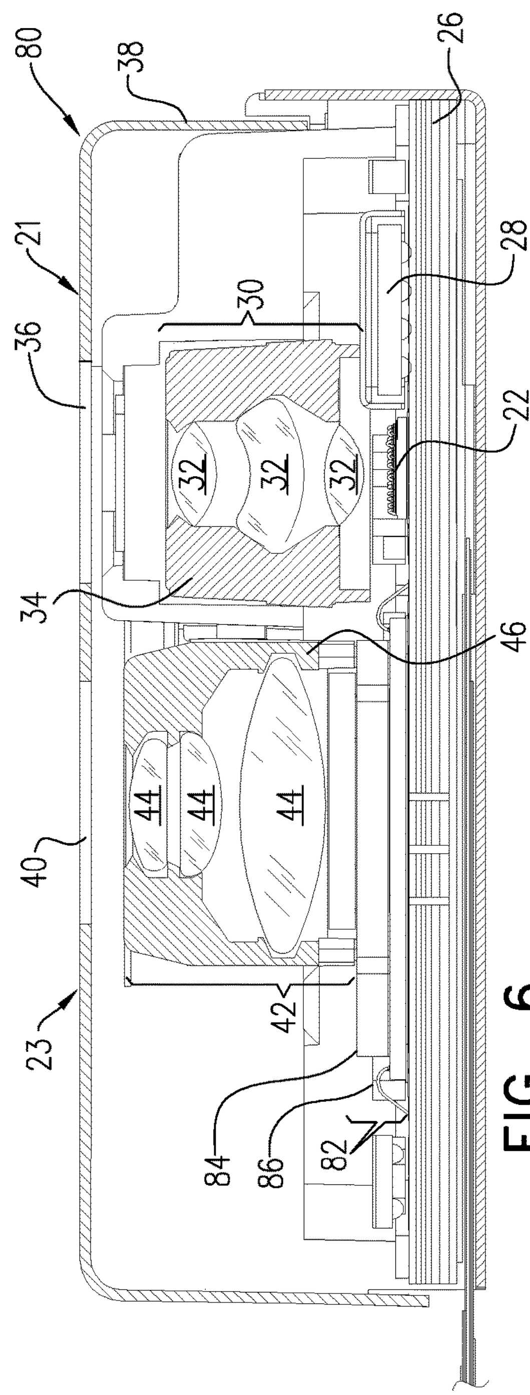
FIG. 6 is a schematic sectional view of an optical module, in accordance with yet another embodiment of the invention.

FIG. 6 is a schematic sectional view of an optical module 80, in accordance with yet another embodiment of the invention. In this embodiment, optical receiver 23 comprises a sensing assembly 82, which includes a submount 86, on which optical sensor 24 (not shown in this figure) is installed. An optical baffle 84 comprising a compressible radiation-absorbing material, such as a suitable closed-cell foam, surrounds the optical sensor. This compressible baffle 84 may be used instead of or in conjunction with a baffle on barrel 34 of transmission lens assembly 30, such as the asymmetrical barrels described above. Alternatively or additionally, optical transmitter 21 may comprise a compressible baffle of this sort.

When module 80 is assembled, barrel 46 of objective lens assembly 42 presses against and compresses baffle 84, thus shutting out stray light from emitter 22. Alternatively, barrel 46 and baffle 84 may be designed to permit a small, controlled amount of stray light to reach sensor 24 for ToF calibration purposes. The use of such a compressible material in baffle 84 is also helpful in relaxing the manufacturing tolerances of module 80 and in absorbing mechanical shocks to sensing assembly 82 from objective lens assembly 42.

Figure 7:
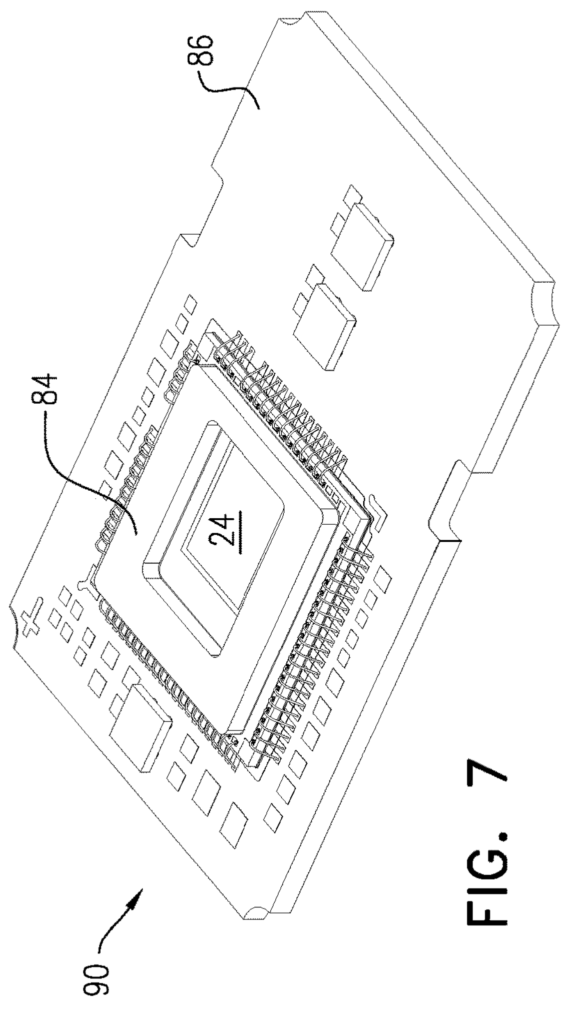
FIG. 7 is a schematic pictorial view of a sensing assembly with a compressible baffle, in accordance with an embodiment of the invention.

FIG. 7 is a schematic pictorial view of a sensing assembly 90 with compressible baffle 84, in accordance with another embodiment of the invention. In this example, baffle comprises a compressible, radiation-absorbing foam disposed as a gasket around sensor 24 on the upper side of the chip package containing the sensor. Other configurations of this sort of compressible baffle will be apparent to those skilled in the art after reading the above description and are considered to be within the scope of the present invention.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An optical device, comprising:

a substrate;

an optical transmitter, which is mounted on the substrate and comprises an optical emitter, which is configured to emit a beam of optical radiation, and a transmission lens assembly, which comprises one or more lenses mounted in a lens barrel and is configured to direct the beam along a transmit axis toward a target;

an optical receiver, which is mounted on the substrate alongside the optical transmitter and comprises an optical sensor and an objective lens assembly, which is configured to focus the optical radiation that is reflected from the target along a receive axis onto the optical sensor; and an optical baffle protruding asymmetrically relative to the transmit axis from an end surface of the lens barrel that is adjacent to the optical emitter toward the substrate in a location between the transmit axis and the receive axis and having an asymmetrical shape configured to block preferentially stray radiation emitted from the optical transmitter toward the receive axis.

2. The device according to claim 1, wherein the substrate comprises an electrical circuit substrate on which the optical emitter and the optical sensor are mounted, and the device comprises ancillary electronic components, which are mounted on the electrical circuit substrate and connected to the optical emitter and the optical sensor by electrical circuit traces.

3. The device according to claim 2, and comprising a case, which contains the transmission lens assembly and the objective lens assembly and is fixed to the substrate so that the transmission lens assembly and the objective lens assembly are positioned respectively over the optical emitter and the optical sensor.

4. The device according to claim 1, wherein the optical baffle is an integral part of the lens barrel.

5. The device according to claim 1, wherein the optical baffle comprises a collar mounted on the lens barrel.

6. The device according to claim 1, wherein the optical baffle comprises an aperture configured to pass a predefined fraction of the emitted beam through the baffle toward the optical sensor.

7. The device according to claim 1, and comprising a light guide extending through the baffle and configured to pass a predefined fraction of the emitted optical radiation through the baffle toward the optical sensor.

8. The device according to claim 1, wherein the optical baffle comprises a compressible radiation-absorbing material, which is compressed upon assembly of the device, thereby preventing the stray radiation from reaching the optical sensor.

9. An optical device, comprising:

a substrate;

an optical receiver, which is mounted on the substrate and comprises:

an optical sensor mounted in a chip package;

a gasket comprising a compressible radiation-absorbing material surrounding the optical sensor on an upper side of the chip package; and an objective lens assembly, which comprises:

one or more lenses configured to focus optical radiation along a receive axis onto the optical sensor; and a lens barrel, which contains the one or more lenses, and which is mounted in the device so as to compress the radiation-absorbing material, thereby preventing stray radiation from reaching the optical sensor.

10. The device according to claim 9, and comprising an optical transmitter, which is mounted on the substrate alongside the optical receiver, and which is configured to emit a beam of the optical radiation along a transmit axis toward a target, wherein the one or more lenses are configured to focus the optical radiation that is reflected from the target onto the optical sensor.

11. The device according to claim 10, wherein the optical transmitter comprises a transmission lens assembly, and wherein the device comprises a case, which contains the transmission lens assembly and the objective lens assembly and is fixed to the substrate so that the transmission lens assembly and the objective lens assembly are positioned respectively over the optical emitter and the optical sensor.

12. The device according to claim 9, wherein the substrate comprises an electrical circuit substrate on which the optical emitter and the optical sensor are mounted, and the device comprises ancillary electronic components, which are mounted on the electrical circuit substrate and connected to the optical emitter and the optical sensor by electrical circuit traces.

13. A method for optical sensing, comprising:

mounting an optical transmitter on a substrate, the optical transmitter comprising an optical emitter, which is configured to emit a beam of optical radiation, and a transmission lens assembly, which comprises one or more lenses mounted in a lens barrel and is configured to direct the beam along a transmit axis toward a target;

mounting an optical receiver on the substrate alongside the optical transmitter, the optical receiver comprising an optical sensor and an objective lens assembly, which is configured to focus the optical radiation that is reflected from the target along a receive axis onto the optical sensor; and positioning an optical baffle to protrude asymmetrically relative to the transmit axis from an end surface of the lens barrel that is adjacent to the optical sensor toward the substrate in a location between the transmit axis and the receive axis, the optical baffle having an asymmetrical shape configured to block preferentially stray radiation emitted from the optical transmitter toward the receive axis.

14. The method according to claim 13, wherein the substrate comprises an electrical circuit substrate on which the optical emitter and the optical sensor are mounted, and the method comprises mounting ancillary electronic components on the electrical circuit substrate for connection to the optical emitter and the optical sensor by electrical circuit traces.

15. The method according to claim 13, wherein the optical baffle is an integral part of the lens barrel.

16. The method according to claim 13, wherein positioning the optical baffle comprises mounting a collar comprising the optical baffle on the lens barrel.

17. The method according to claim 13, wherein the optical baffle comprises an aperture configured to pass a predefined fraction of the emitted beam through the baffle toward the optical sensor.

18. The method according to claim 13, wherein the optical baffle comprises a compressible radiation-absorbing material.

* * * * *